(12) United States Patent
Chpakovski (10) Patent No.: US 8,096,473 B2
(45) Date of Patent: Jan. 17, 2012

(54) OPTICAL READER FOR READING IDENTIFICATION CODES ON OPTICAL DISCS

(75) Inventor: Vladimir Chpakovski, Mississauga (CA)

(73) Assignee: Xiris Automation, Inc., Burlington, Ontario (CA)

( * ) Notice: Subject to any disclaimer, the term of this patent is extended or adjusted under 35 U.S.C. 154(b) by 632 days.

(21) Appl. No.: 12/209,817

(22) Filed: Sep. 12, 2008

(65) Prior Publication Data

US 2009/0073847 A1 Mar. 19, 2009

Related U.S. Application Data

(60) Provisional application No. 60/960,080, filed on Sep. 14, 2007.

(51) Int. Cl.
*G06K 7/10* (2006.01)

(52) U.S. Cl. ............. 235/454; 235/462.25; 235/462.42; 235/470; 369/100; 369/272.1; 369/275.1

(58) Field of Classification Search .................. 235/454, 235/462.25, 462.42, 470; 369/100, 272.1, 369/275.1
See application file for complete search history.

(56) References Cited

U.S. PATENT DOCUMENTS

| | | | |
|---|---|---|---|
| 3,473,027 A | | 10/1969 | Freeman et al. |
| 4,567,370 A | | 1/1986 | Falls |
| 5,313,373 A | | 5/1994 | Bjorner et al. |
| 5,585,616 A | | 12/1996 | Roxby et al. |
| 5,631,456 A | | 5/1997 | Kost et al. |
| 6,009,057 A | * | 12/1999 | Furukawa et al. ........... 369/52.1 |
| 6,184,534 B1 | | 2/2001 | Stephany et al. |
| 7,079,230 B1 | | 7/2006 | McInerney et al. |
| 7,175,086 B2 | * | 2/2007 | Gascoyne et al. ............. 235/454 |
| 7,220,535 B2 | | 5/2007 | Lawandy et al. |
| 7,646,691 B2 | * | 1/2010 | Morishima ................ 369/53.23 |
| 2004/0188527 A1 | * | 9/2004 | Tien ......................... 235/462.42 |
| 2005/1021191 | | 9/2005 | Franken et al. |
| 2006/0072444 A1 | * | 4/2006 | Engel et al. ................. 369/275.1 |
| 2008/0149721 A1 | * | 6/2008 | Shadwell ................. 235/462.01 |

* cited by examiner

*Primary Examiner* — Allyson Trail
(74) *Attorney, Agent, or Firm* — Steven M. Greenberg, Esq.; Carey, Rodriguez, Greenberg & O'Keefe, LLP (57) ABSTRACT

An optical reader comprises a housing, at least one light source inside the housing and an image sensor whose terminus is inside the housing. The housing has a longitudinal axis and a disc-receiving portion for receiving an optical disc so that the optical disc is coaxial with the longitudinal axis. The at least one light source is positioned on the longitudinal axis to illuminate the identification code on the optical disc and be reflected therefrom. The terminus of the image sensor is also positioned on the longitudinal axis, further from the disc-receiving portion than the at least one light source, and oriented to capture the identification code within its field of view. The image sensor and the at least one light source are cooperatively configured so that the terminus of the image sensor receives light reflected from the identification code and thereby readably detects the identification code.

18 Claims, 10 Drawing Sheets

SECTION 5-5
FIG. 5

FIG. 8

OPTICAL READER FOR READING IDENTIFICATION CODES ON OPTICAL DISCS

CROSS REFERENCE TO RELATED APPLICATIONS

This application claims priority to U.S. Provisional Patent Application No. 60/960,080 filed on Sep. 14, 2007, the teachings of which are hereby incorporated by reference.

FIELD OF INVENTION

This invention relates to optical readers, and more particularly to optical readers for reading identification codes on optical discs.

BACKGROUND OF THE INVENTION

Optical discs are discs that hold video, sound or computer data, for example compact discs (CDs), CD-ROMs, DVDs and Blu-Ray Discs®. (The term "BLU-RAY DISC" is a registered trade-mark of the Blu-Ray Disc Association, having an address at 10 Universal City Plaza, T-100, Universal City, Calif. 91608.). Optical discs usually have an identification code, for example as a bar code or in alphanumeric format, to identify what is on the disc. For optical discs such as CDs, CD-ROMs, DVDs and Blu-Ray Discs, the identification codes are usually carried on an annular portion of the disc near the central aperture therein, within an annular band having an inner diameter of approximately 33 mm and an outer diameter of approximately 47 mm. Typically, the identification code is molded into the disc at the time that the disc is manufactured.

Optical readers are used to read the identification code so that the contents of an optical disc can be readily identified. Such optical readers are used for example by sellers of optical discs who ship those optical discs to customers, an optical reader being used to ensure that a customer is being shipped the intended optical disc. Generally, an optical reader will capture an image or video stream of the identification code, and then transmit it to a computer running software capable of extracting the relevant information from the image or video stream.

Prior art optical readers have used a ring light source, i.e. an annular array of lights, with a sensor such as a camera positioned to view the optical disc through the aperture of the ring light source, so that light would be reflected back to the camera from the region of the optical disc containing the identification code.

SUMMARY OF THE INVENTION

In one aspect, the present invention is directed to an optical reader for reading an identification code on a read side of an optical disc. The optical reader comprises a housing, the housing having a longitudinal axis and having a disc-receiving portion for receiving an optical disc in an orientation perpendicular to the longitudinal axis so that the optical disc is coaxial with the longitudinal axis with a read side of the disc facing the housing. The optical disc has an annular identification code region on its read side. The optical reader further comprises at least one light source disposed within the housing, the at least one light source being positioned on the longitudinal axis, so that when an optical disc is received by the disc-receiving portion and the at least one light source transmits light, at least some of the light illuminates the identification code region of the optical disc and thereby illuminates the identification code and is reflected therefrom. The optical reader further comprises an image sensor having at least a terminus thereof disposed within the housing and positioned on the longitudinal axis and oriented to capture the identification code region of the optical disc, and thereby the identification code, within a field of view of the image sensor, the image sensor being further from the disc-receiving portion than the at least one light source. The image sensor and the at least one light source are cooperatively configured so that the terminus of the image sensor receives at least some of the light transmitted from the at least one fight source and reflected from the identification code, whereby the image sensor can readably detect the identification code.

In one embodiment, the at least one light source consists of a single light source. The single light source may be a direct light source.

In another embodiment, the at least one light source consists of a plurality of light sources. The plurality of light sources may be direct light sources, and may be two light sources. The plurality of light sources may transmit light from different portions of the spectrum.

In another aspect, the present invention is directed to an optical reader. The optical reader comprises a housing having a longitudinal axis, the housing having a disc-receiving portion which removably receives an optical disc in an orientation which is perpendicular to the longitudinal axis of the housing. The optical reader further comprises at least one light source located on the longitudinal axis of the housing rearwardly of and facing an optical disc when the optical disc is received by the disc-receiving portion of the housing. The optical reader further comprises a camera located on the longitudinal axis of the housing rearwardly of the at least one light source and facing towards the rear of the at least one light source and the optical disc to receive light reflected by an identification code region of the optical disc when the at least one light source is illuminated and an optical disc is received by the disc-receiving portion with its read side facing the at least one light source and the camera, to thereby read an identification code on the identification code region.

In one embodiment, the at least one light source comprises a first light source and a second light source mounted rearwardly of the first light source and forwardly of the camera. The first and second light sources may be co-operable whereby the camera receives reflected light originating from both light sources to effect reading of the identification code on the identification code region. The first and second light sources may be separately operable whereby the camera receives light from a single one of the light sources to effect reading of the identification code on the identification code region.

In a further aspect, the present invention is directed to an optical reader. The optical reader comprises a housing having a notional optical element positioning axis extending therethrough. The optical reader further comprises a receiver secured to the housing for receiving an optical disc having a read side functioning as a reflective annular axicon, having a central aperture and having an annular identification code region containing an identification code, and defining a perpendicular central axis of symmetry. The receiver defines a notional reflection plane, wherein when such an optical disc is received by the receiver the central axis of symmetry is collinear with the optical element positioning axis, and the read side is coplanar with the reflection plane. At least one light source is disposed within the housing and positioned on the optical element positioning axis to face the receiver, with each at least one light source having a transverse light source diameter d measured perpendicularly to the optical element positioning axis, and each at least one light source is a distance $L_O$ from the reflection plane. An image sensor has its terminus disposed within the housing and positioned on the optical element positioning axis to face the receiver. The terminus of the image sensor is further from the receiver than the at least one light source, and the terminus of the image sensor has a viewing angle β and has an aperture for receiving light, with the aperture having a transverse aperture diameter $d_S$ measured perpendicularly to the optical element positioning axis. The terminus of the image sensor is a distance $L_S$ from the reflection plane. A relationship among each d, each $L_O$, and $d_S$ and $L_S$ is such that when such an optical disc is received by the receiver, light transmitted from the at least one light source is reflected with a diffraction order having angular correspondence with the viewing angle β so that a portion of an image zone corresponding to the diffraction order is disposed in the aperture so that a readable image of the identification code is captured by the image sensor.

In one embodiment, the portion of the image zone disposed in the aperture corresponds to one or more wavelengths to which the image sensor is particularly sensitive.

In one embodiment, each light source is a direct light source. The at least one light source may comprise a single light source, or may comprise a plurality of light sources. The plurality of light sources may be two light sources. The plurality of light sources may transmit light from different portions of the spectrum.

BRIEF DESCRIPTION OF THE DRAWINGS

These and other features of the invention will become more apparent from the following description in which reference is made to the appended drawings wherein.

DETAILED DESCRIPTION

Blu-Ray Discs have a complicated structure, relative to the structure of CDs and DVDs. The result is that when Blu-Ray Discs are illuminated by traditional ring-type optical readers, the illumination system creates a light pattern that is different from that created when CDs and DVDs are illuminated. In particular, the ring-type illumination arrangement results in a side illumination on the disc area, so that light which did reach the identification code region would generally be reflected back on the features of the identification code itself, resulting in insufficient contrast for an image sensor, such as a camera, to be able to readably detect the identification code.

Figure 1A:
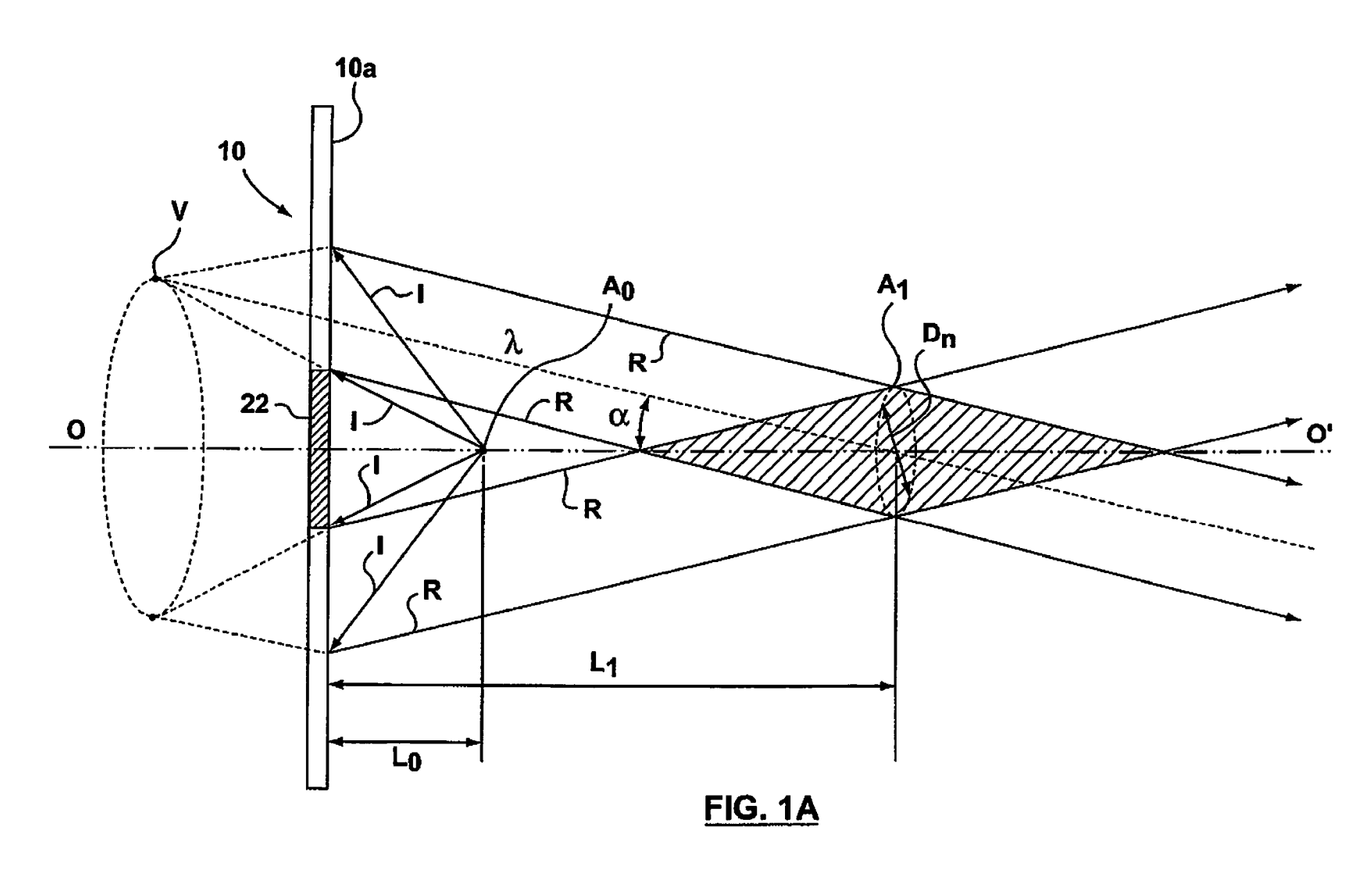
FIG. 1A shows reflection of monochromatic light from an optical disc.

Referring now to FIG. 1A, an optical disc is indicated generally at 10. As noted above, optical discs with which aspects of the present invention may be used include optical discs having CD, CD-ROM, DVD and Blu-Ray formats, as well as other formats having the requisite optical properties. The read side 10a of the optical disc 10 has circular or spiral grooves (not shown in FIG. 1A) with approximately constant spacing, which grooves act as a concentric phase diffraction grating. The read side 10a also has reflective properties. The grooves and reflective properties cooperate so that the read side 10a of the optical disc 10 functions as a reflective annular axicon. As used herein, the term "axicon" refers to an optical element which transforms a spherical or a plane wavefront to a conical or sub-conical wavefront. Thus, when a spherical wavefront of light strikes the read side 10a of the optical disc 10, it will be reflected back as a wavefront with a combination of conical and spherical components rather than as a spherical wavefront. The optical disc 10 has a central aperture 22.

Continuing to refer to FIG. 1A, the optical disc 10 defines a central axis of symmetry OO'. A monochromatic point light source $A_0$ is positioned on the central axis of symmetry OO' at a distance $L_0$ from the read side surface of the optical disc 10. The point light source $A_0$ emits monochromatic light toward the read side 10a of the optical disc 10, and incident light beams I are, because the read side 10a of the disc 10 functions as a reflective annular axicon, reflected back from the optical disc 10 as sphero-conical reflected light beams R. These reflected light beams R are equivalent to a virtual circular source V producing a series of diffraction orders that form concentrated energy distributions in the zones of real images along the central axis of symmetry OO'. For example, in FIG. 1A, a first real image zone $A_1$ corresponding to the first diffraction order is formed on the central axis of symmetry OO' at a distance $L_1$ from the read side 10a of the optical disc 10, with a diffraction angle $\alpha_1$. Similarly, although not shown in FIG. 1A, a second real image zone $A_2$ corresponding to the second diffraction order would be formed at a different location on the central axis of symmetry OO', and with a different diffraction angle. It will be appreciated that each image zone $A_n$ will have a transverse diameter $D_n$, that is, a diameter $D_n$ measured perpendicularly to the central axis of symmetry OO'.

Figure 1B:
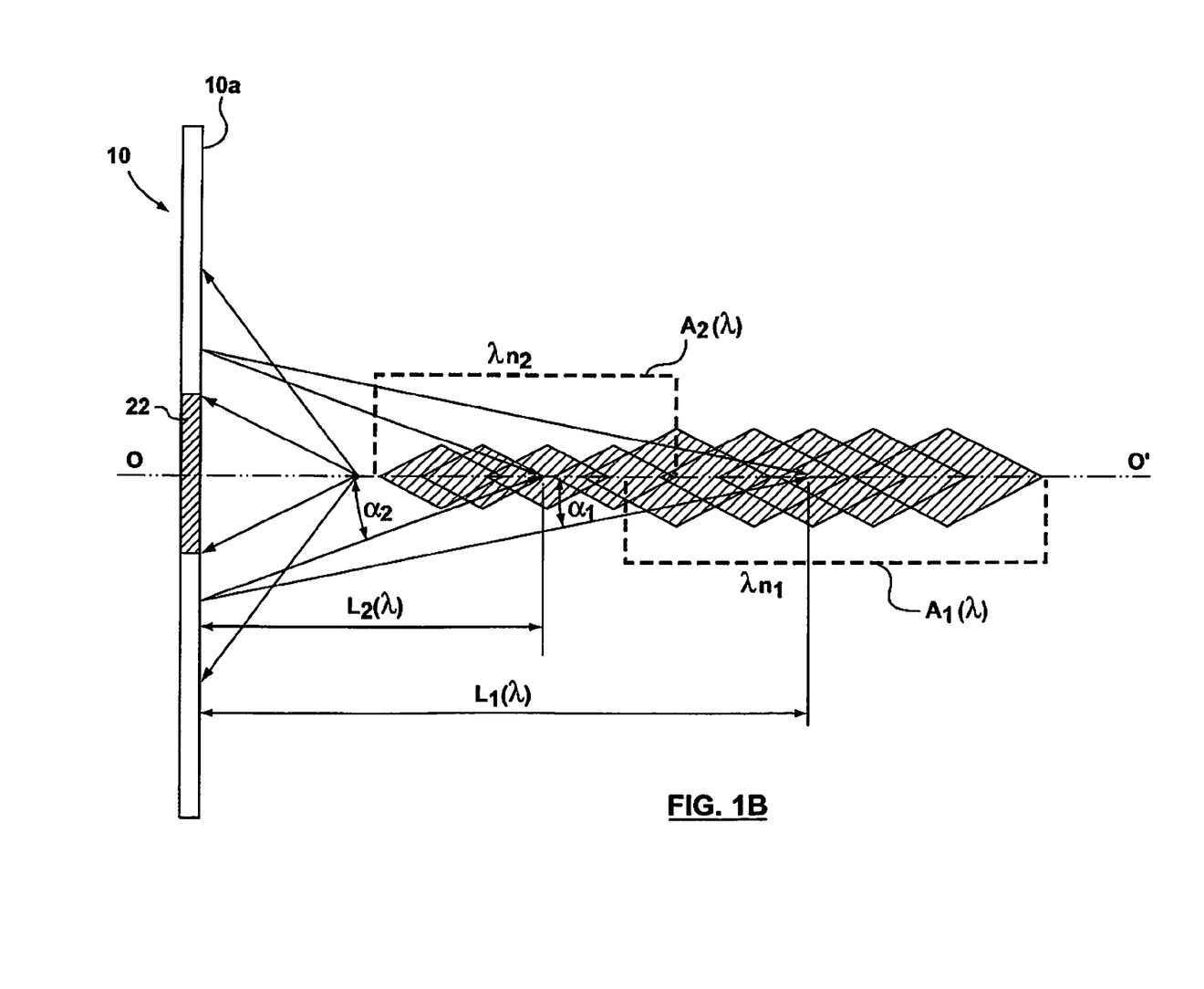
FIG. 1B shows reflection of polychromatic light from an optical disc.

With reference now to FIG. 1B, when a point light source $A_0$ is polychromatic (i.e. the light has multiple wavelengths $\lambda_1 \ldots \lambda_n$, such as with white light) rather than monochromatic (i.e. a single wavelength $\lambda$), a more complicated behavior is demonstrated in the optical system. In these circumstances, each wavelength $\lambda_1 \ldots \lambda_n$ of light emitted from the light source $A_0$ produces a series of diffraction orders which extend the axial zones (i.e. the portion of the central axis of symmetry OO' on which the respective images appear). Thus, where in FIG. 1A a single image (such as image $A_1$) would be formed for each diffraction order because only a single wavelength λ of light is present, in FIG. 1B there are multiple images for each diffraction order (i.e. for a given diffraction order, each wavelength $\lambda_1 \ldots \lambda_n$ of light emitted from the light source $A_0$ produces one image on the central axis of symmetry OO'). Therefore, each diffraction order has associated therewith an image zone comprising an axial series of images, one for each wavelength $\lambda_1 \ldots \lambda_n$ of light emitted from the light source $A_0$. This is illustrated in FIG. 1B by image zones $A_1(\lambda)$, corresponding to the first diffraction order, and image zone $A_2(\lambda)$, corresponding to the second diffraction order. Thus, the image zone $A_1(\lambda)$ comprises the first diffraction order images generated by each wavelength $\lambda_n$, denoted by $\lambda_{n1}$, and the image zone $A_2(\lambda)$ comprises the second diffraction order images generated by each wavelength $\lambda_n$, denoted by $\lambda_{n2}$. For simplicity, additional image zones $A_n(\lambda)$ are not shown in FIG. 1B. Each image zone $A_n(\lambda)$ has a parameter $L_n(\lambda)$ describing the distance of each image zone, measured from a common reference point such as the midpoint of the image zone $A_n(\lambda)$ to the read side 10a of the optical disc 10, and a diffraction angle $\alpha_n(\lambda)$. It will be appreciated that image zones $A_n(\lambda)$ may overlap one another, such as image zones $A_1(\lambda)$ and $A_2(\lambda)$, and that the image zone for the highest order of diffraction occurs closest to the optical disc 10. The images for longer wavelength light will appear closer to the optical disc 10, and the images for shorter wavelength light will appear farther away from the optical disc 10.

Analogously to the individual images $A_n$ described in the context of FIG. 1A, each image zone $A_n(\lambda)$ has a transverse diameter $D_n(\lambda)$ (not shown in FIG. 1B), which is determined by the distance $L_n(\lambda)$ from the read side 10a of the optical disc 10 and the location of the $n^{th}$ diffraction order.

It will be appreciated that the position on the central axis of symmetry OO' of an image $A_n$ or, where multiple wavelengths of light are used, the position of an image zone $A_n(\lambda)$, can be influenced by varying the distance $L_0$ between the light source $A_0$ and the read side 10a of the optical disc 10. It will also be appreciated that in FIGS. 1A and 1B, and the associated description, the light source $A_0$ was a point source, in order to facilitate simplicity of explanation.

Figure 1C:
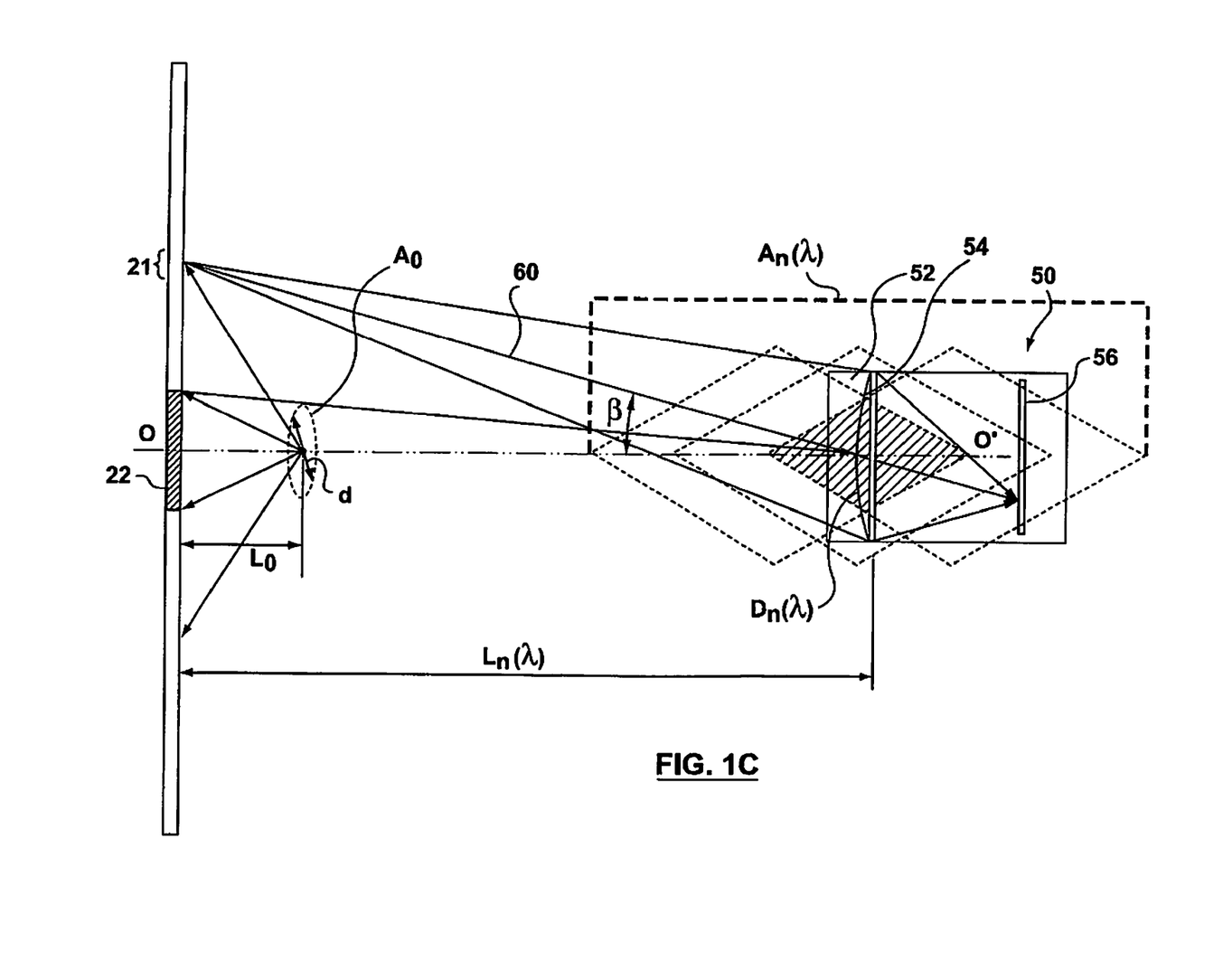
FIG. 1C is a schematic representation of an exemplary optical system in accordance with an aspect of the present invention.

With reference now to FIG. 1C, the optical disc 10 has an annular identification code region 21, that is, a region containing an identification code, near the central aperture 22. (The optical disc 10, central aperture 22 and identification code region 21 are not shown to scale in FIGS. 1A-1C.)

Continuing to refer to FIG. 1C, in a real optical system, the light source $A_0$ will not be a point source, but will have a transverse diameter d, that is, diameter d is measured perpendicular to the central axis of symmetry OO'. The light source $A_0$ is centered on, i.e. is coaxial with, the central axis of symmetry OO'. Increasing the transverse diameter d of the light source $A_0$ will result in a corresponding increase in the diameter $D_n(\lambda)$ of the image zones $A_n(\lambda)$. Thus, where an image sensor is positioned on the central axis of symmetry OO', coaxially with the optical disc 10, various parameters can be adjusted to allow the image sensor to receive a readable image of the annular identification code region 21 on the read side 10a of the optical disc 10.

In the particular embodiment shown in FIG. 1C, the image sensor is a camera 50 comprising an aperture 52 having a lens 54, and an image detector 56, such as a charge-coupled device (CCD) or complementary metal-oxide-semiconductor (CMOS) circuit, as is known in the art, positioned rearwardly of the aperture 52. The camera 50 is centered on the central axis of symmetry OO'. The aperture 52 has a diameter $d_S$. The camera 50 has a viewing angle $\beta$, which is the angle formed between the central axis of symmetry OO' and a line 60 running from the edge of the annular identification code region 21 to the centre of the lens 54.

For a given image sensor and light source, it is possible to design an optimal or at least an advantageous geometry by selectively manipulating one or more of (a) the distance $L_S$ of the image sensor to the optical disc 10; and (b) the distance $L_0$ of the light source $A_0$ from the optical disc 10. In particular, the distances $L_S$ and $L_0$ can be "tuned" so that a particular diffraction order "n" (or a series of diffraction orders from $\lambda_n$ placed in overlapping zones) will have diffraction angles $\alpha_n(\lambda)$ that correspond to the viewing angle $\beta$ of the image sensor (camera 50 in FIG. 1C), and the portion of the image zone $A_n$ corresponding to the wavelength (or combination of wavelengths) to which the image sensor is most sensitive, and most efficient in generating an image, will fill the aperture of the image sensor (aperture 52 in the case of camera 50). It will be appreciated that the wavelength (or wavelengths) to which the image sensor is most sensitive and most efficient in terms of generating an image will depend on the characteristics of the image detector (image detector 56 in the case of camera 50).

Moreover, further "tuning" can be achieved by selecting the light source $A_0$ to have a given diameter d, and selecting the type and axial position of the image sensor so as to define a specific viewing angle $\beta$. In particular, the diameter d of the light source $A_0$ may be selected so as to produce a desired diameter $D_n(\lambda)$ of the relevant image zone $A_n(\lambda)$ so as to fully fill the aperture of the image sensor, and the viewing angle $\beta$ may be selected so that the light path from the identification code region on the read side 10a of the optical disc 10 to the aperture of the image sensor is not obstructed by the light source $A_0$.

Thus, the geometry of an optical reader may be configured by selecting or adjusting the following interdependent parameters:

(a) distance $L_0$ of the light source $A_0$ from the optical disc 10;
(b) diameter d of the light source $A_0$;
(c) wavelength(s) of the light source $A_0$;
(d) distance $L_S$ of the image sensor from the optical disc 10;
(e) diameter $d_S$ of the aperture of the image sensor;
(f) wavelength(s) to which the image detector in the image sensor is most sensitive and most efficient in generating an image; and
(g) viewing angle $\beta$ of the image sensor.

In addition, more than one light source may be used, as long as the light sources are positioned on the central axis of symmetry OO' and their axial position and parameters are appropriately selected.

An optical reader can be constructed in accordance with the foregoing principles. Such an optical reader would include a housing, and a receiver secured to the housing for receiving an optical disc, with the housing having a notional optical element positioning axis extending therethrough and the receiver defining a notional reflection plane normal to the optical element positioning axis.

The optical disc with which the optical reader is to be used is an optical disc having a read side functioning as a reflective annular axicon, having a central aperture and having an annular identification code region containing an identification code. Such a disc would also define, as described above, a central axis of symmetry that is perpendicular to the flat surface of the optical disc and which passes through the center of the central aperture of the optical disc.

In such an optical reader constructed according to aspects of the present invention, the housing and the receiver are structured so that when an optical disc is received by the receiver, the central axis of symmetry of that optical disc is collinear with the optical element positioning axis, and the read side of the optical disc is coplanar with the reflection plane.

At least one light source is disposed within the housing and positioned on the optical element positioning axis to face the receiver. Each light source has a transverse light source diameter d, measured perpendicularly to the optical element positioning axis, and each light source is located a distance $L_0$ from the reflection plane. Thus, when an optical disc is received by the receiver, each respective light source will be positioned on the central axis of symmetry of the optical disc at a distance $L_O$ from the read side of the optical disc, and can emit light toward the optical disc.

At least a terminus of an image sensor is also disposed within the housing, positioned on the optical element positioning axis to face the receiver. The terminus of the image sensor is positioned further from the receiver than the light source (or sources). The terminus of the image sensor has a viewing angle β and has an aperture for receiving light, with the aperture having a transverse aperture diameter $d_S$ measured perpendicularly to the optical element positioning axis. The terminus of the image sensor is located a distance $L_S$ from the reflection plane. Accordingly, when an optical disc is received by the receiver, the terminus of the image sensor will be positioned on the central axis of symmetry of the optical disc at a distance $L_S$ from the read side of the optical disc, facing the read side of the optical disc.

According to an aspect of the invention, the relationship among each d, each $L_O$, and $d_S$ and $L_S$ is such that when such an optical disc is received by the receiver, light emitted from the at least one light source is reflected with a diffraction order having angular correspondence with the viewing angle β, so that a portion of an image zone corresponding to that diffraction order is disposed in the aperture of the terminus of the image sensor so that a readable image of the identification code is captured by the image sensor.

Having now described certain operative principles of aspects of the invention, the construction of particular exemplary embodiments will now be described.

In the illustrated embodiments, each light source is a direct light source. As used herein, the term "direct light source" is intended to refer to an element which actually generates light, such as a light-emitting diode (LED), and not to an element which merely redirects light originating elsewhere, such as a prism, mirror or fiber-optic cable. However, it is also contemplated that such an indirect light source may be disposed within the housing, with the actual light-generating element being located outside of the housing.

Moreover, while in the illustrated embodiments the entire image sensor, in the form of a camera, is disposed within the housing, it will be appreciated that only the terminus of the image sensor need be disposed in the housing. As used herein, the word "terminus", in the context of an image sensor, refers to the portion of the image sensor which initially receives the light used to sense the image. In the simple case where the image sensor is a camera having an aperture and lens, the aperture and lens combination would be considered to be the terminus. Other, more complicated arrangements are also contemplated, such as where the terminus of the image sensor is located within the housing and other components of the image sensor are located outside the housing. In such embodiments, an image is initially received by the terminus and then transmitted to the other components of the image sensor, such as by mirrors or by a fiber optic cable. The terminus of the image sensor is oriented to capture the identification code region of the optical disc, and thereby the identification code, within the image sensor's field of view.

The housing will define a longitudinal axis. The term "longitudinal axis", as used herein, does not imply that the housing is necessarily symmetrical, rather, the term "longitudinal axis" refers to a line passing through the housing of an optical reader and that is perpendicular to an optical disc when the same is received by such optical reader. Thus, in the embodiments in respect of which the term is used, the "longitudinal axis" serves as the optical element positioning axis.

The housing is constructed so that when an optical disc is received thereby, the optical disc is coaxial with the longitudinal axis of the housing, that is, the longitudinal axis of the housing passes through the center of the optical disc, and the optical disc is perpendicular to the longitudinal axis of the housing. Thus, the central axis of symmetry of the optical disc will be collinear with longitudinal axis of the housing when the optical disc is received. The at least one light source and the terminus of the image sensor are positioned on, i.e. are coaxial with, the longitudinal axis of the housing. It is contemplated that, where an indirect light source is used, the light-generating element may be within the housing but not on the longitudinal axis, or outside of the housing. Similarly, it is contemplated that where the entire image sensor is not positioned on the longitudinal axis, portions of the image sensor may be inside the housing or outside the housing.

Because the optical disc, when received by the optical reader, is co-axial with the longitudinal axis, on which are positioned at least the terminus of the image sensor and the at least one light source, when the at least one light source emits light, at least some of the light illuminates the identification code region of the optical disc, that is, the region which contains the identification code. As described above, the image sensor and the at least one light source are cooperatively configured so that the terminus of the image sensor receives at least some of the light emitted from the at least one light source and reflected from the identification code, enabling the image sensor to readably detect the identification code.

Figure 2:
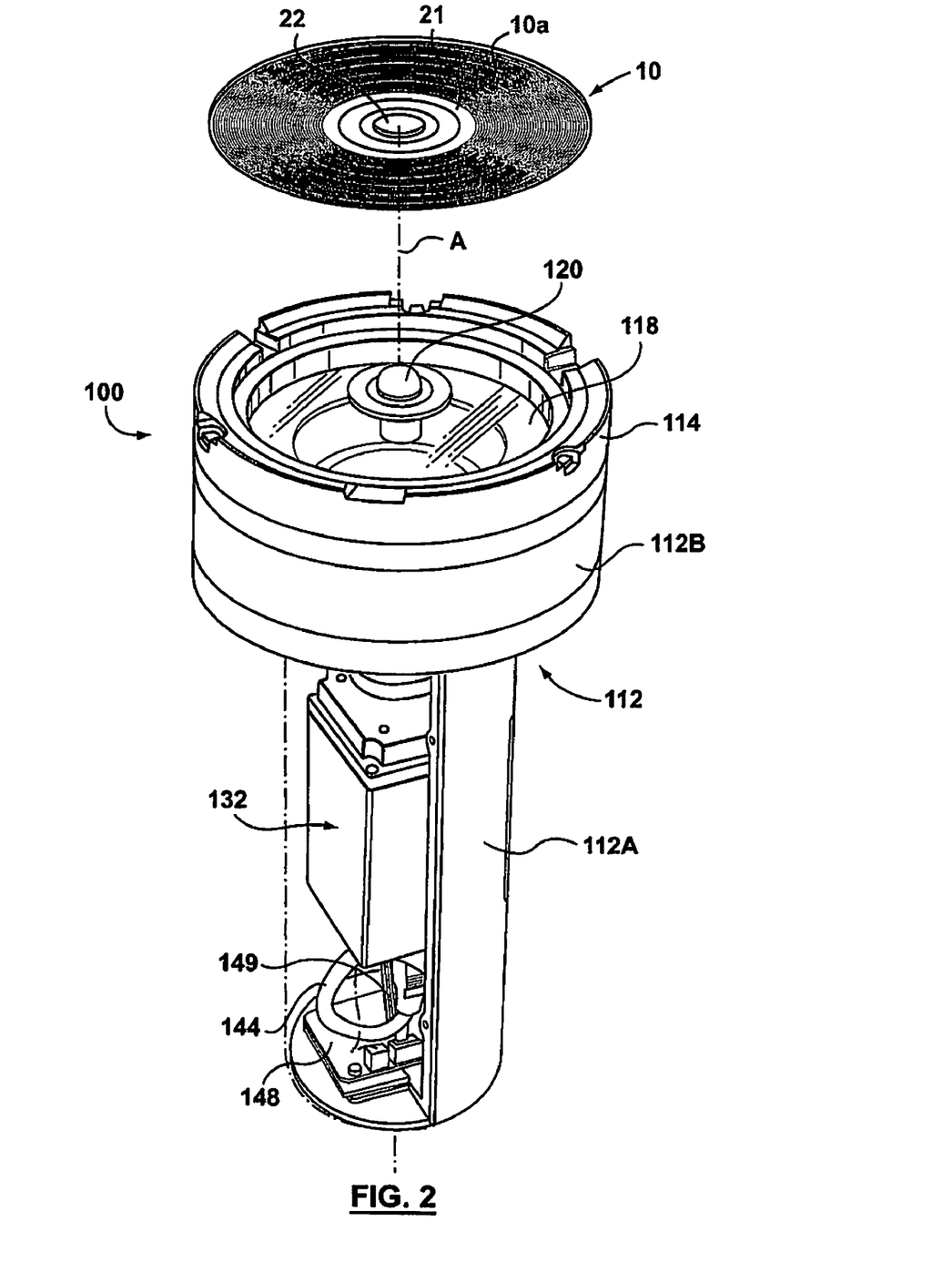
FIG. 2 is a perspective view of a first embodiment of an optical reader according to an aspect of the present invention, as well as an optical disc.
Figure 3:
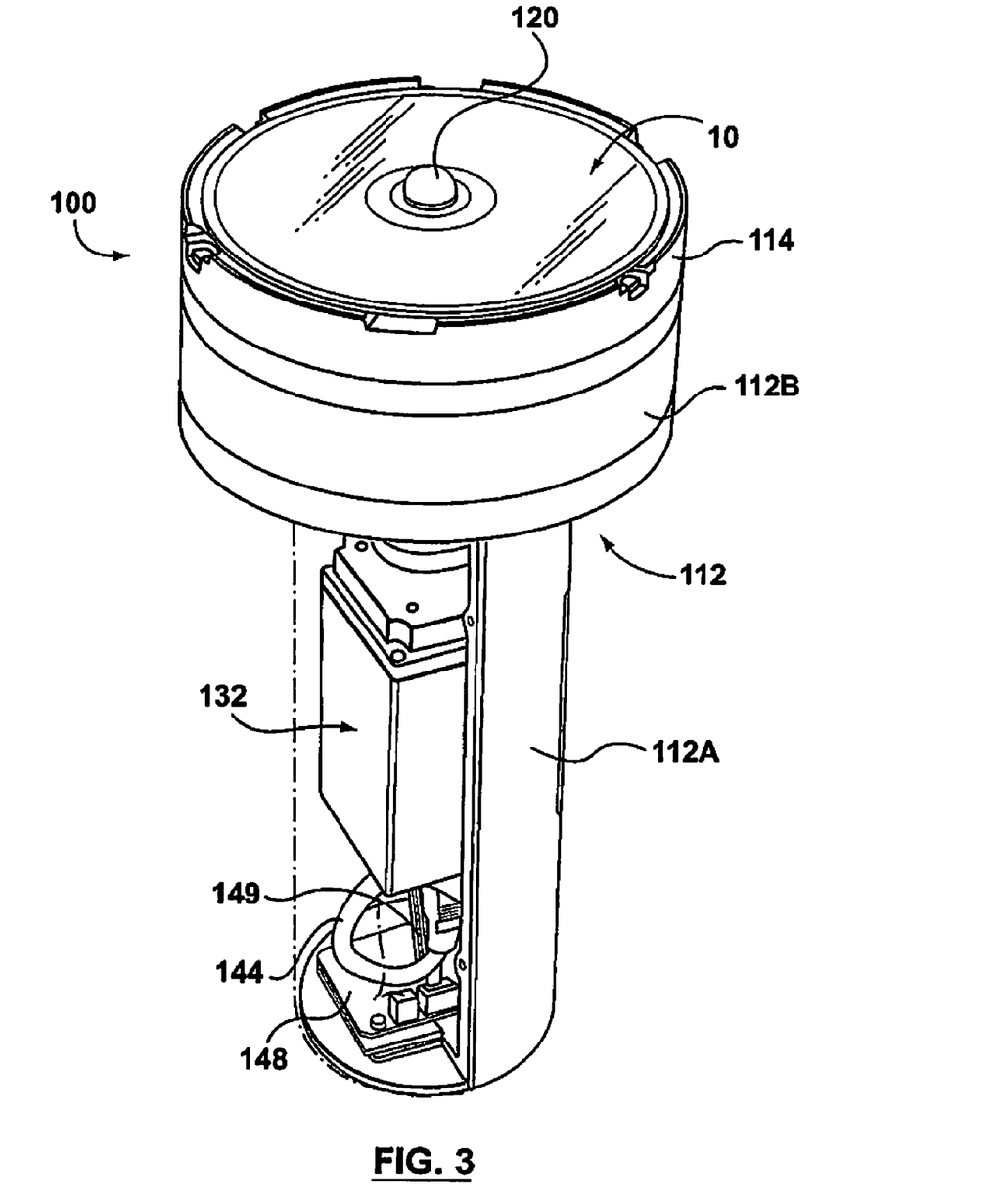
FIG. 3 is a perspective view of the optical reader of FIG. 2, with an optical disc received thereon.
Figure 4:
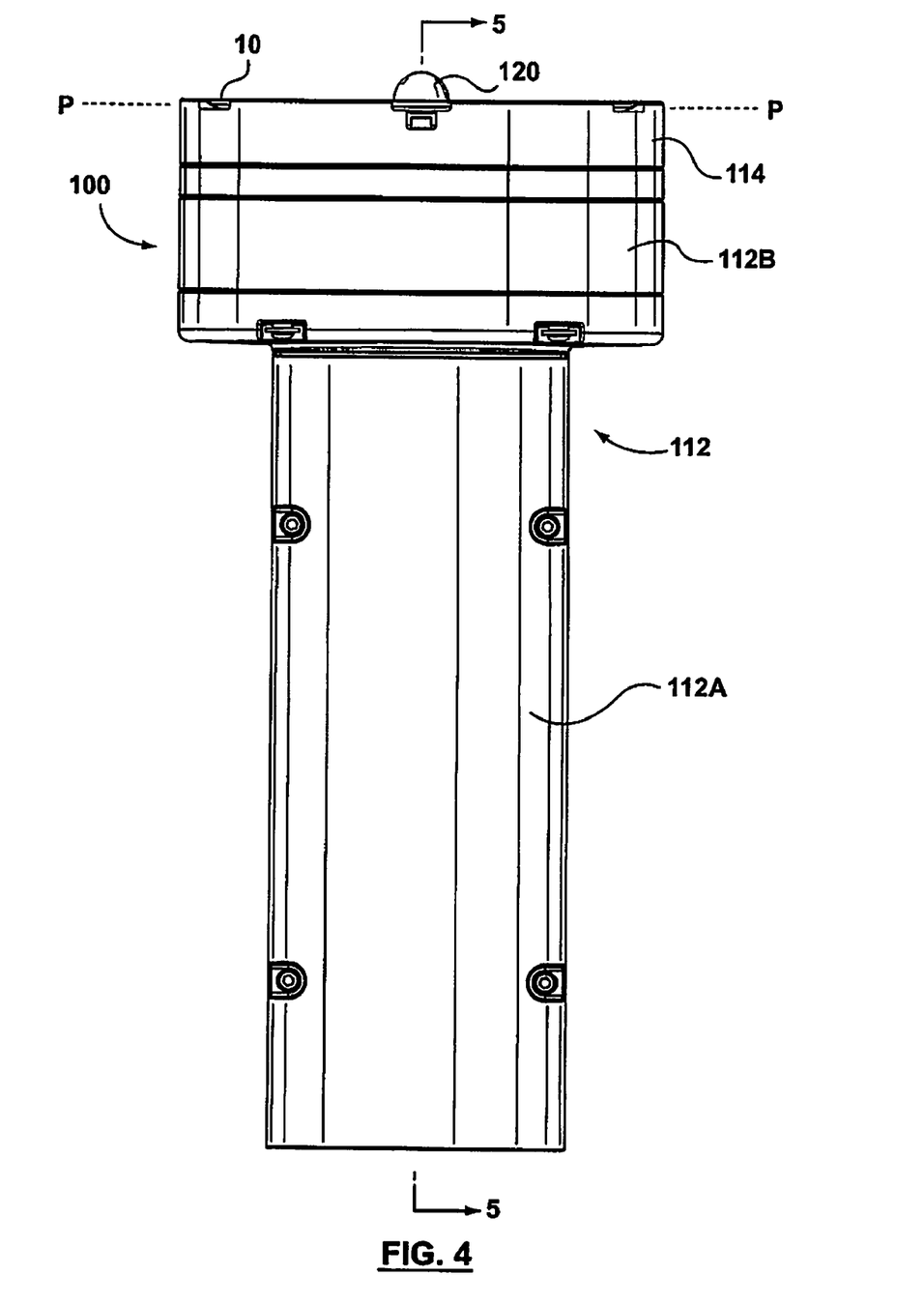
FIG. 4 is a side view of the optical reader of FIG. 3.

Referring first to FIGS. 2, 3 and 4, a first exemplary embodiment of an optical reader is shown generally at 100, in conjunction with an optical disc 10 as has been described above. The optical reader 100 has a housing 112 with a longitudinal axis A. In the particular embodiment shown, the housing 112 is generally cylindrical, and comprises a main shaft portion 112A and an enlarged end portion 112B (although not illustrated in the Figures, suitable non-tubular shapes may also be used). In FIGS. 2 and 3, a portion of the main shaft portion 112A of the housing 112 is shown with the main cover removed therefrom to reveal certain components inside the main shaft portion 112A.

Figure 5:
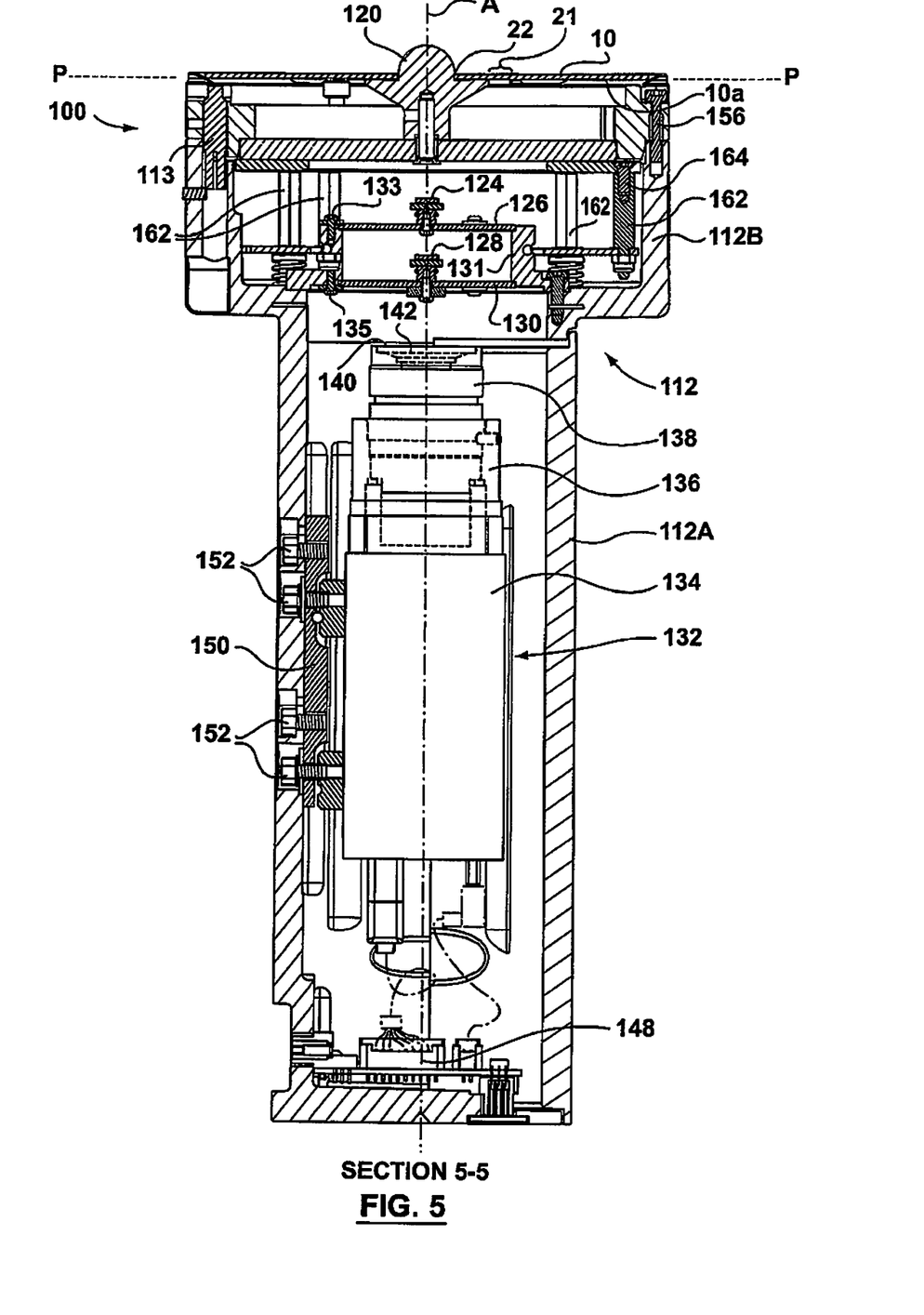
FIG. 5 is a side cross-sectional view of the optical reader of FIG. 3, taken along the line 5-5 in FIG. 4.

The end portion 112B of the housing 112 includes a circular disc-receiving portion 114 which removably receives the optical disc 10 in an orientation which is perpendicular to the longitudinal axis A, so that the optical disc 110 is coaxial with the longitudinal axis A and the read side 10a of the optical disc 10 faces the housing 112. Thus, the disc-receiving portion 114 is the receiver and, as indicated above, when the optical disc 10 is received at the disc-receiving portion 114, the longitudinal axis A will be collinear with the central axis of symmetry (not shown in FIGS. 2, 3 and 4) of the optical disc 10. Also as noted above, the optical disc 10 has an annular identification code region 21 near its central aperture 22. The disc receiving portion 114 defines, by way of the axial position on the longitudinal axis A at which the optical disc 10 is received, the reflection plane P with which the read side 10a of the optical disc 10 is coplanar when the optical disc 10 is received by the disc-receiving portion 114. A proximity sensor 113 (not shown in FIGS. 2, 3 and 4—see FIGS. 5, 6 and 7) is received within a recess adjacent the circumference of the disc-receiving portion 114, to detect the presence of an optical disc such as optical disc 10.

Continuing to refer to FIGS. 2, 3 and 4, a circular first optically transparent support member 118 extends across the disc-receiving portion 114, and carries a disc centering member 120 engageable with the central aperture 22 of an optical disc, such as optical disc 10. As used herein, the term "optically transparent" means that the material, given its thickness, does not materially adversely affect the direction of light travelling therethrough. The disc centering member 120 is preferably formed from a rigid material, and the portion thereof extending outwardly from the first optically transparent support member 118 is preferably hemispherical in shape and sized to correspond to the size of the central aperture 22 of the optical disc 10, to facilitate alignment of the optical disc 10 relative to the disc-receiving portion 114. Alternatively, the disc centering member 120 can be made from a resilient material so that it can retain optical disc 10 by way of a friction fit or an interference fit. The first optically transparent support member 118 may be made from any suitable material, including glass and plastic, and the disc centering member 120 may be secured thereto by any suitable means, such as by way of mounting pin 123.

The inner surface of the peripheral rim 115 of the disc-receiving portion 114 is preferably angled, that is, downwardly sloping, so that the circumferential corner of the optical disc 10 will balance thereon when the optical disc 10 is received by the disc-receiving portion 114, thereby providing a gap 117 (see FIG. 7) to facilitate removal of the optical disc from the disc-receiving portion 114.

Figure 6:
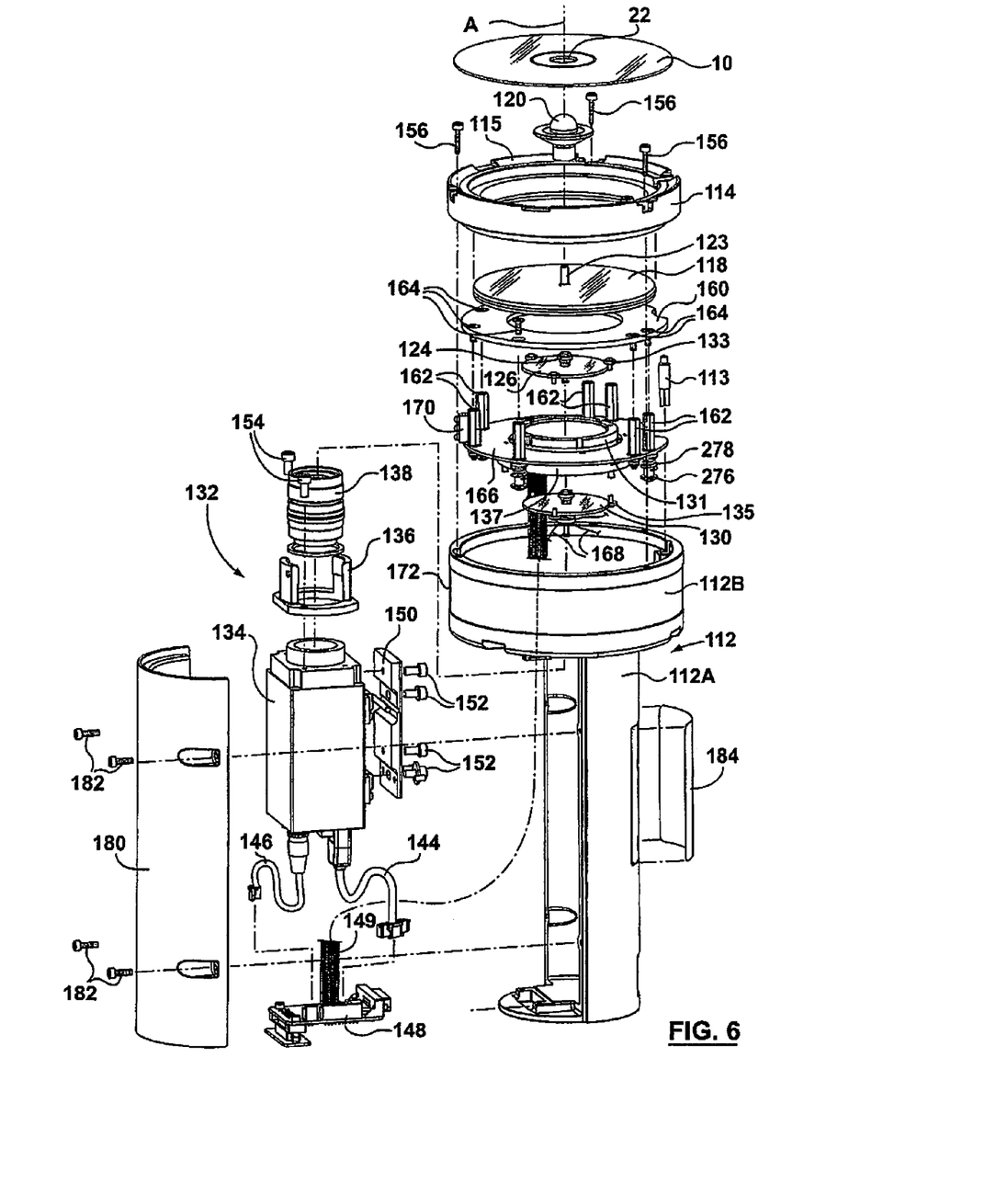
FIG. 6 is an exploded perspective view of the optical reader of FIG. 3.
Figure 7:
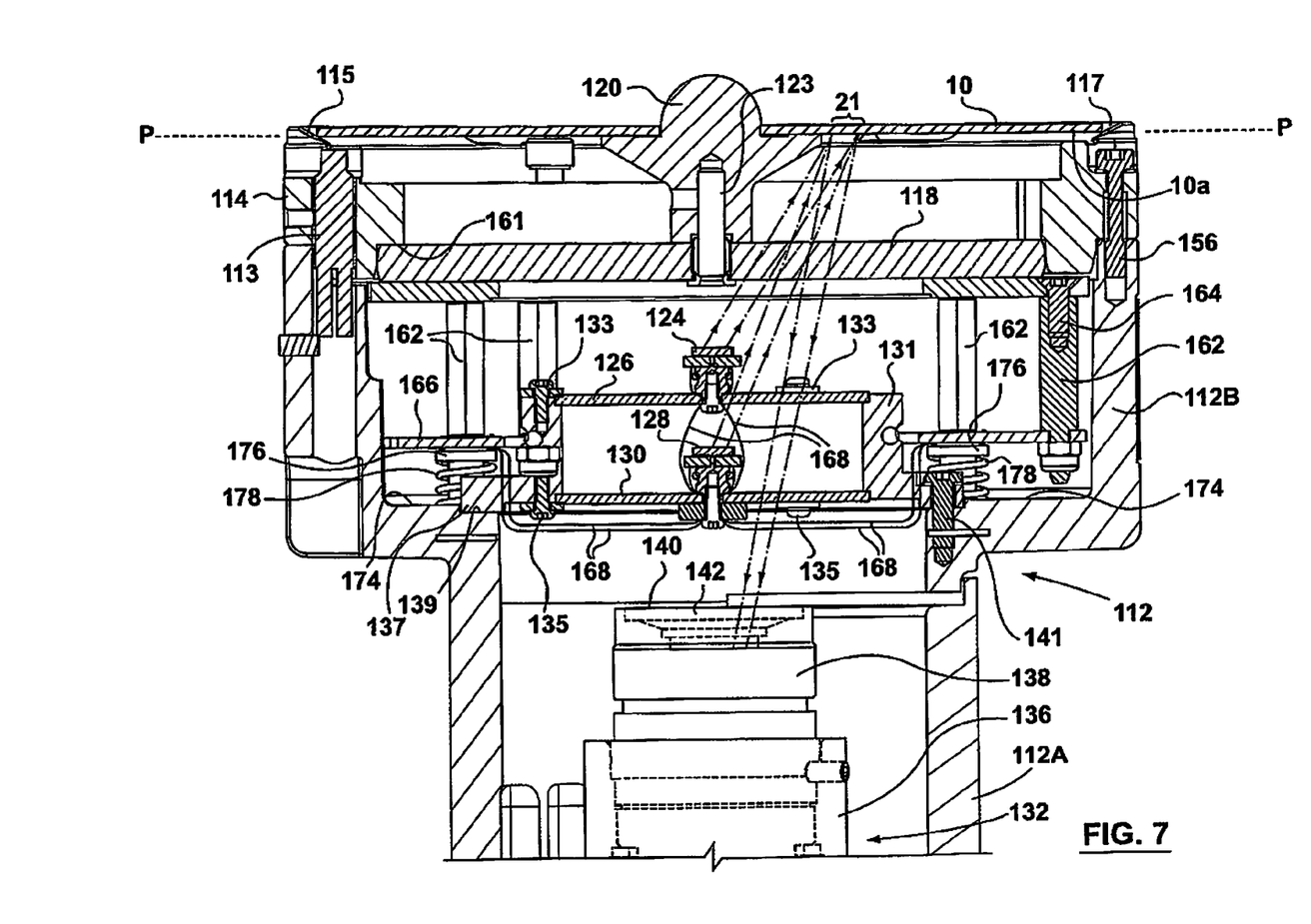
FIG. 7 is a side cross-sectional view of an upper portion of the optical reader of FIG. 3.

Referring now to FIGS. 6 and 7, a first light emitting diode (LED) 124 (including its mounting assembly) is located on the longitudinal axis A, rearwardly of the optical disc 10. The first LED 124 is mounted on a circular second optically transparent support member 126 so as to face towards the reflection plane P and therefore the optical disc 10 when the same is received by the disc-receiving portion 114. A second LED 128 (including its mounting assembly) is also located on the longitudinal axis A, rearwardly of the first LED 124. The second LED 128 is mounted on a circular third optically transparent support member 130. The second and third optically transparent support members 126, 130 are secured to a cylindrical mounting member 131 by respective screw/washer assemblies 133, 135, and may be made from any suitable material, including glass and plastic. The cylindrical mounting member 131 has an outer annular lip 137 at its lower end so that it can be supported by a corresponding annular shoulder 139 inside the housing 112, to which it is secured by screws 141.

A camera 132 is also located on the longitudinal axis A. The camera 132 is positioned rearwardly of the second LED 128, and comprises a camera body 134 which contains the image detector and other electronic components, an objective lens assembly clamp 136, and an objective lens assembly 138. A spacer ring 141 is disposed between the objective lens assembly clamp 136 and the objective lens assembly 138, which is secured to the camera body 134 by way of screws 154. The objective lens assembly 138 defines an aperture 140, within which is disposed a first or main lens or lens set 142. The camera 132, in particular the camera body 134, is adjustably secured, by way of a mounting plate 150 and mounting screws 152, to the interior of the main shaft portion 112A of the housing 112. The camera 132 is coupled by way of video cable 144 and electrical cable 146 to an interface card 148, with the interface card being coupled by ribbon cable 149 to the circuit board 166 (see below). The interface card allows the camera 132 to transmit an image or a video stream of the identification code to a computer, so that it can be analyzed in known manner. The particular computer or analysis software or methods used do not form part of the present invention. It will be appreciated that while the camera 132 will have a particular viewing angle β (as described above) enabling it to capture the identification code region 21 in its field of view, as a practical matter part of the viewing angle β will be obstructed by the disc centering member. However, this does not affect the actual viewing angle β; rather the camera 132 will simply see the underside of the disc centering member 120 within the viewing angle β.

The disc-receiving portion 114 is secured to the end portion 112B of the housing 112 by way of mounting screws 156. The first optically transparent support member 118 is, in turn, supported by an annular diffuser plate 160, that is, the peripheral circumferential edge of the first optically transparent support member 118 is sandwiched between the annular diffuser plate 160 and an annular or substantially annular lip 161 inside the disc-receiving portion 114. The annular diffuser plate 160 may be made, for example, from a translucent white plastic.

The annular diffuser plate 160 is carried by a set of spacers 162, to which it is secured by mounting screws 164, with the spacers 162 being secured to an annular circuit board 166 used to control and provide electrical power to the LEDs 124, 128. More particularly, the LEDs 124, 128 are supplied with electrical power via thin wires 168 which connect the LEDs 124, 128 to the circuit board 166. In addition to being thin, the wires 168 are positioned so that they do not interfere with the image of the identification code. Specifically, vertical portions of the wires 168 running from the first LED 124 are, in practical terms, on the optical axis of the camera 132, and where the wires 168 cross the field of view of the camera 132, they are out of the depth of field for the camera 132. To the extent that the wires may be seen by the camera 132, the wires 168 are sufficiently thin that, given their location relative to the camera, they do not affect readability of the image of the identification code. An indicator 170, using LEDs (different from LEDs 124, 128) to indicate the status of the optical reader 100 is disposed on the circuit board 166, and those LEDs are visible via a display panel 172 on the outside of the enlarged end portion 112B when the optical reader 100 is assembled.

The circuit board 166 is supported by the annular bottom surface 174 inside the enlarged end portion 112B of the housing 112. In particular, mounting screws 176 pass from the annular bottom surface 174 through the circuit board 166 into some of the spacers 162, and coil springs 178 surround the mounting screws 176, between the annular bottom surface 174 and the circuit board 166.

A main cover 180, forming approximately half of the cylinder of the main shaft portion 112A, is removably mounted to the other half thereof by way of mounting screws 182, so as to enable access to the camera 132 and interface card 148. A cover plate 184 is provided on the non-cover side of the main shaft portion 112A.

With reference now to FIG. 7, a light ray trace is shown, showing paths of light travelling from first LED 124 and second LED 128 to the identification code region 21 on the optical disc 10, and being reflected back through the optically transparent support members 118, 126, 128 into the aperture 140 of the objective lens assembly 138 of the camera 132.

The embodiment 100 of an optical reader described above in the context of FIGS. 2 to 7 is suitable for use with a Blu-Ray Disc, where the annular identification code region is within an annular band having an inner diameter of approximately 33 millimeters and an outer diameter of approximately 47 millimeters. In the optical reader 100, the LEDs 124, 128 are model number NS6W083T offered by Nichia Corporation, having an address at 491 Oka, Kaminaka-Cho, Anan-Shi, Tokushima 774-8601, Japan, emit approximately white light (a wavelength of approximately 400 to 750 nanometers) and have an effective diameter of approximately 4.3 millimeters. Each LED emits light over an angle of approximately 120 degrees. The camera 132 is a Pixel PL-B741F monochrome camera, offered by PixeLINK, which has an address of 3030

Conroy Road, Ottawa, Ontario, Canada K1G 6C2. The first LED 124 is located approximately 31.5 millimeters from the reflection plane, and hence approximately 31.5 millimeters from the read side 10a of the optical disc 10 when received. The second LED 128 is located approximately 46.5 millimeters from the reflection plane, and hence approximately 46.5 millimeters from the read side 10a of the optical disc 10 when received. The distance between the LEDs 124, 128 and the optical disc 10 is measured from the surface of the read side of the optical disc to the surface of the relevant LED. The aperture 140 of the camera 132 is located approximately 71.5 millimeters from the reflection plane P, and hence approximately 71.5 millimeters from the read side 10a of the optical disc 10 when received. In this sense, the aperture 140, for purposes of measurement, is the end of the objective lens assembly 138 of the camera 132, although the actual lens or lenses 142 are somewhat recessed therefrom.

Figure 8:
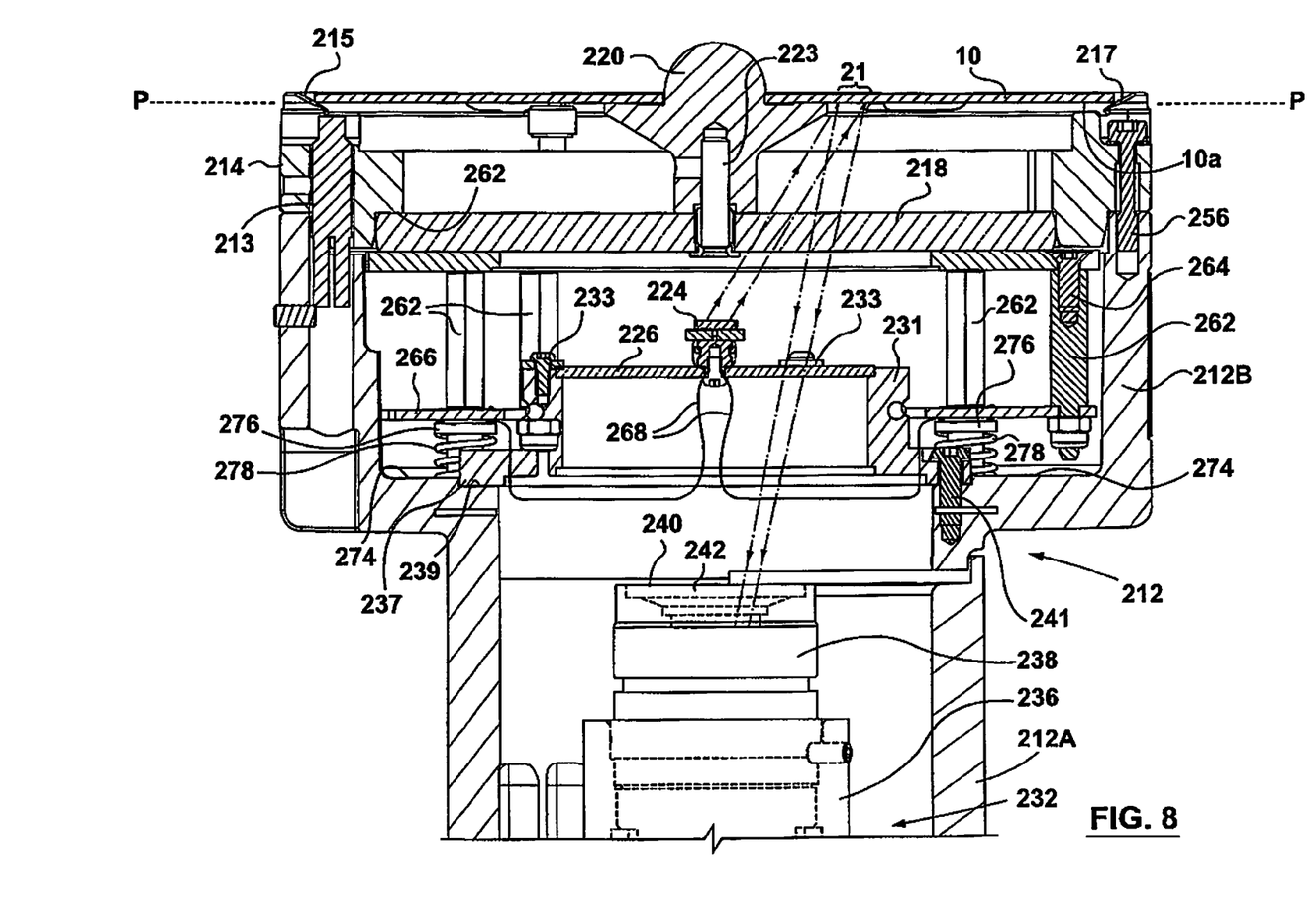
FIG. 8 is a side cross-sectional view of an upper portion of a second embodiment of an optical reader, in accordance with an aspect of the present invention.

With reference now to FIG. 8, an alternative embodiment of an optical reader having only a single LED is shown generally at 200. The optical reader 200 is substantially similar to the optical reader 100, except that it is adapted to use only a single LED 224. Thus, the second LED 128 and its associated components, such as the third optically transparent support member 130, which were present in the optical reader 100 are omitted from the optical reader 200. Accordingly, identical reference numerals have been used to describe identical or analogous parts, except that those reference numerals have been incremented by 100. Thus, for example, the disc centering member is denoted by reference numeral 220 instead of reference numeral 120, and there is only a single set of wires 268 connecting the single LED 224 to the circuit board 266. In FIG. 8, a light ray trace is shown, showing paths of light travelling from the single LED 224 to the identification code region 21 on the optical disc 10, and being reflected back through the optically transparent support members 218, 226 into the aperture 240 of the objective lens assembly 238 of the camera 232.

Like the optical reader 100, the optical reader 200 may be used with optical discs whose annular identification code region is within an annular band having an inner diameter of approximately 33 millimeters and an outer diameter of approximately 47 millimeters. The single LED 224 in the optical reader 200 is, like the LEDs 124, 128 in the optical reader 100, model number NS6W083T offered by Nichia Corporation, which emits approximately white light (a wavelength of approximately 400 to 750 nanometers) over an angle of approximately 120 degrees and has an effective diameter of approximately 4.3 millimeters. Also like the optical reader 100, the camera 232 in the optical reader 200 is a Pixel PL-B741F monochrome camera, offered by PixeLINK. The single LED 224 is located approximately 31.5 millimeters from the reflection plane, and hence approximately 31.5 millimeters from the read side 10a of the optical disc 10, measured from the surface of the read side of the optical disc to the surface of the LED 224. The aperture 240 of the camera 232 is located approximately 71.5 millimeters from the reflection plane P, and hence approximately 71.5 millimeters from the read side 10a of the optical disc 10. The aperture 240, for purposes of measurement, is the end of the objective lens assembly 238 of the camera 232, although the actual lens or lenses 242 are somewhat recessed therefrom.

Other embodiments of an optical reader, not shown in the Figures, may be constructed according to aspects of the invention for use with differently sized optical discs. For example, an optical reader may be constructed for use with optical discs having an annular identification code region within an annular band having an inner diameter of approximately 8 millimeters and an outer diameter of approximately 13 millimeters. In a first such embodiment, a single LED is used, which emits approximately white light (a wavelength of approximately 400 to 750 nanometers) over an angle of approximately 120 degrees and has an effective diameter of approximately 2.9 millimeters. A Pixel PL-B741F monochrome camera, offered by PixeLINK, is used as the image sensor. The single LED is located approximately 19.5 millimeters from the reflection plane, and hence approximately 19.5 millimeters from the read side of the optical disc. The aperture of the camera is located approximately 47.5 millimeters from the reflection plane, and hence approximately 47.5 millimeters from the read side of the optical disc. Again, distance between the LED and the optical disc is measured from the surface of the read side of the optical disc to the surface of the LED, and the aperture of the camera is the end of the objective lens assembly of the camera, even if the actual lens or lenses are recessed. In another such embodiment, a second LED may be added in accordance with aspects of the present invention.

It will be appreciated that optical readers constructed in accordance with aspects of the present invention may include light sources such as LEDs that produce near-UV light, infrared or near-infrared light, or a wavelength from the visible spectrum. Accordingly, an optical reader may include LEDs adapted to produce different types of light, which may enhance the ability of the image sensor in such an optical reader to detect identification codes. Thus a first light source may produce light from a first part of the spectrum, and a second light source may produce light from a second part of the spectrum; the terms "first" and "second" being used solely for convenience of reference and not implying any relative position on the spectrum. Even where only a single light source is used, such a light source need not produce white light, but could produce either near-UV light, infra-red or near-infrared light, or a wavelength from the visible spectrum to enhance the image seen by the image sensor.

Also, where more than one light source is used, each light source may subtend a different angle, or the light sources may subtend the same angle. In addition, both light sources may be illuminated simultaneously, or only one of the light sources may be illuminated, in order to produce desired optical effects.

It should also be noted that while the embodiments herein shown and described have included a single light source or two light sources, more than two light sources may be used in accordance with aspects of the present invention. Additionally, while exemplary embodiments have been described as using LEDs as light sources, it is to be appreciated that other suitable light sources may also be used.

Reference has been made herein to optical discs, and in particular to a generic exemplary optical disc 10. It is to be appreciated that while the present invention is intended to work in conjunction with such optical discs, optical discs per se do not form part of the present invention. Accordingly, inclusion of the term "optical disc" in the claims is solely for the purpose of clarity in describing how aspects of the present invention work in association with suitable optical discs, and is not intended to imply that optical discs form part of the claimed subject matter.

One or more currently preferred embodiments have been described by way of example. It will be apparent to persons skilled in the art that a number of variations and modifications can be made without departing from the scope of the invention as defined in the claims.

What is claimed is:

1. An optical reader for reading an identification code on a read side of an optical disc, comprising:
   a housing, the housing having a longitudinal axis and having a disc-receiving portion for receiving an optical disc in an orientation perpendicular to the longitudinal axis so that the optical disc is coaxial with the longitudinal axis with a read side of the disc facing the housing, the optical disc having an annular identification code region on its read side;
   at least one light source disposed within the housing, the at least one light source being positioned on the longitudinal axis, so that when an optical disc is received by the disc-receiving portion and the at least one light source transmits light, at least some of the light illuminates the identification code region of the optical disc and thereby illuminates the identification code and is reflected therefrom; and
   an image sensor having at least a terminus thereof disposed within the housing and positioned on the longitudinal axis and oriented to capture the identification code region of the optical disc, and thereby the identification code, within a field of view of the image sensor, the image sensor being further from the disc-receiving portion than the at least one light source;
   and wherein the image sensor and the at least one light source are cooperatively configured so that the terminus of the image sensor receives at least some of the light transmitted from the at least one light source and reflected from the identification code, whereby the image sensor can readably detect the identification code.

2. The optical reader of claim 1, wherein the at least one light source consists of a single light source.

3. The optical reader of claim 2, wherein the single light source is a direct light source.

4. The optical reader of claim 1, wherein the at least one light source consists of a plurality of light sources.

5. The optical reader of claim 4, wherein the plurality of light sources are direct light sources.

6. The optical reader of claim 4, wherein the plurality of light sources is two light sources.

7. The optical reader of claim 4, wherein the plurality of light sources transmit light from different portions of a spectrum.

8. An optical reader, comprising:
   a housing having a longitudinal axis, the housing having a disc-receiving portion which removably receives an optical disc in an orientation which is perpendicular to the longitudinal axis of the housing;
   at least one light source located on the longitudinal axis of the housing rearwardly of and facing an optical disc when the optical disc is received by the disc-receiving portion of the housing; and
   a camera located on the longitudinal axis of the housing rearwardly of the at least one light source and facing towards the rear of the at least one light source and the optical disc to receive light reflected by an identification code region of the optical disc when the at least one light source is illuminated and an optical disc is received by the disc-receiving portion with its read side facing the at least one light source and the camera, to thereby read an identification code on the identification code region.

9. The optical reader of claim 8, wherein the at least one light source comprises a first light source and a second light source mounted rearwardly of the first light source and forwardly of the camera.

10. The optical reader of claim 9, wherein the first and second light sources are co-operable whereby the camera receives reflected light originating from both light sources to effect reading of the identification code on the identification code region.

11. The optical reader of claim 9, wherein the first and second light sources are separately operable whereby the camera receives light from a single one of the light sources to effect reading of the identification code on the identification code region.

12. An optical reader comprising:
   a housing having a notional optical element positioning axis extending therethrough;
   a receiver secured to the housing for receiving an optical disc having a read side functioning as a reflective annular axicon, having a central aperture and having an annular identification code region containing an identification code, and defining a perpendicular central axis of symmetry, the receiver defining a notional reflection plane, wherein when such an optical disc is received by the receiver the central axis of symmetry is collinear with the optical element positioning axis, and the read side is coplanar with the reflection plane;
   at least one light source disposed within the housing and positioned on the optical element positioning axis to face the receiver, each at least one light source having a transverse light source diameter d measured perpendicularly to the optical element positioning axis, each at least one light source being a distance $L_0$ from the reflection plane;
   an image sensor having its terminus disposed within the housing and positioned on the optical element positioning axis to face the receiver, the terminus of the image sensor being further from the receiver than the at least one light source, the terminus of the image sensor having a viewing angle $\beta$ and having an aperture for receiving light, the aperture having a transverse aperture diameter $d_S$ measured perpendicularly to the optical element positioning axis, the terminus of the image sensor being a distance $L_S$ from the reflection plane;
   wherein a relationship among each d, each $L_0$, and $d_S$ and $L_S$ is such that when such an optical disc is received by the receiver, light transmitted from the at least one light source is reflected with a diffraction order having angular correspondence with the viewing angle $\beta$ so that a portion of an image zone corresponding to the diffraction order is disposed in the aperture so that a readable image of the identification code is captured by the image sensor.

13. The optical reader of claim 12, wherein the portion of the image zone disposed in the aperture corresponds to one or more wavelengths to which the image sensor is particularly sensitive.

14. The optical reader of claim 12, wherein each of the at least one light source is a direct light source.

15. The optical reader of claim 12, wherein the at least one light source comprises a single light source.

16. The optical reader of claim 12, wherein the at least one light source comprises a plurality of light sources.

17. The optical reader of claim 12, wherein the plurality of light sources is two light sources.

18. The optical reader of claim 12, wherein the plurality of light sources transmit light from different portions of a spectrum.

* * * * *